Figure 1:
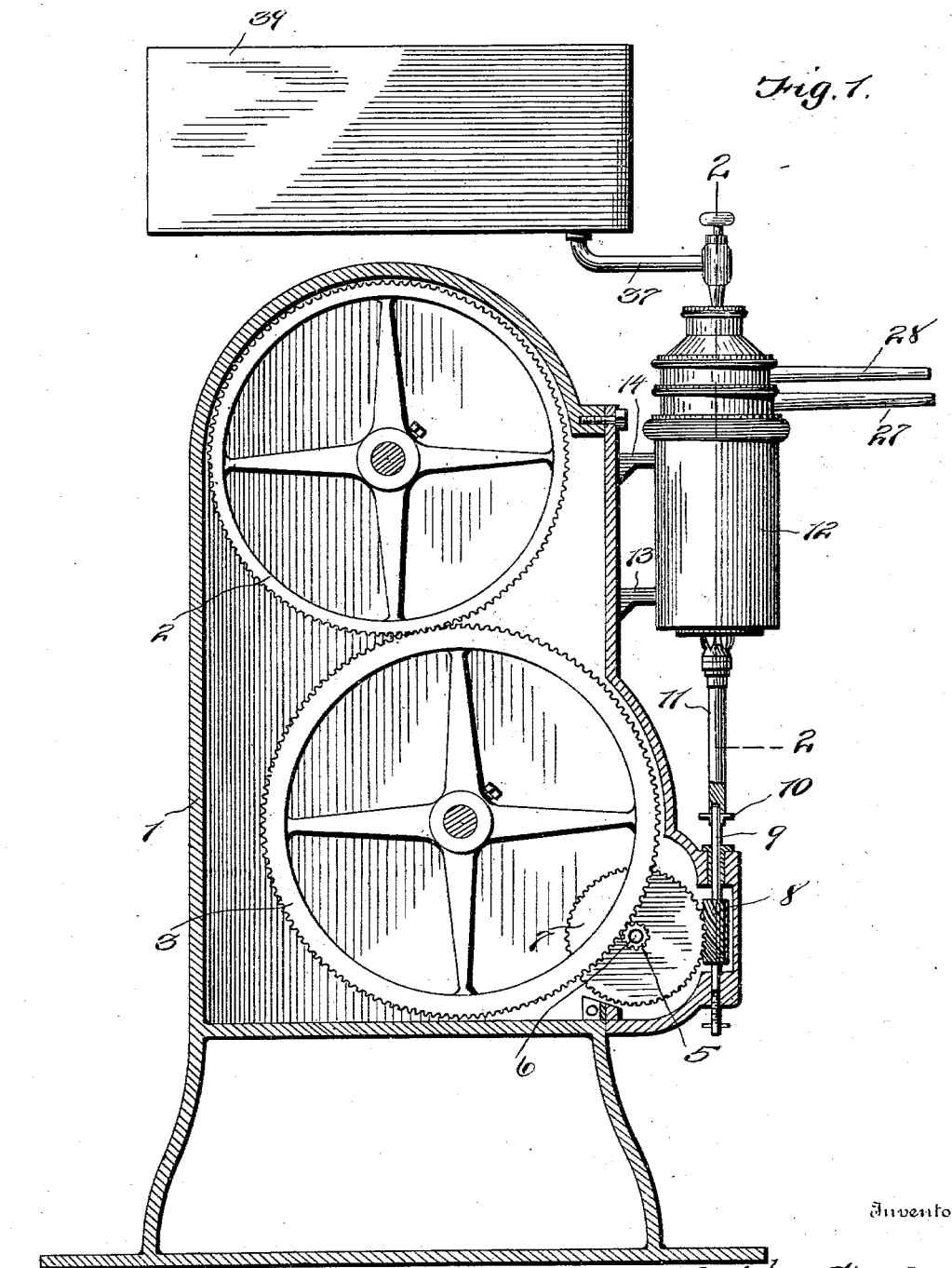

No. 752,934. PATENTED FEB. 23, 1904.
E. & B. STARCH.
CREAM SEPARATOR.
APPLICATION FILED JULY 16, 1903.
NO MODEL. 2 SHEETS—SHEET 1.

Witnesses
R. V. Boswell
A. G. Miller

Inventors
Emil Starch
and Benjamin Starch
By W. T. FitzGerald & Co.
Attorneys

No. 752,934. PATENTED FEB. 23, 1904.
E. & B. STARCH.
CREAM SEPARATOR.
APPLICATION FILED JULY 16, 1903.
NO MODEL. 2 SHEETS—SHEET 2.
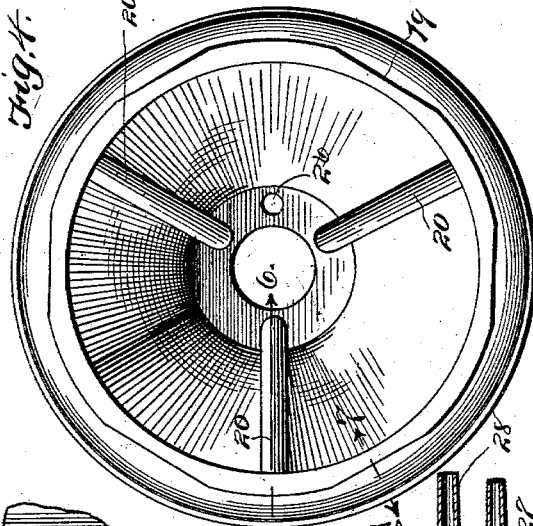
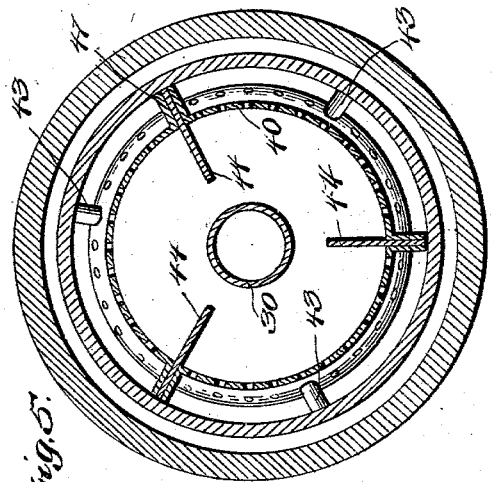
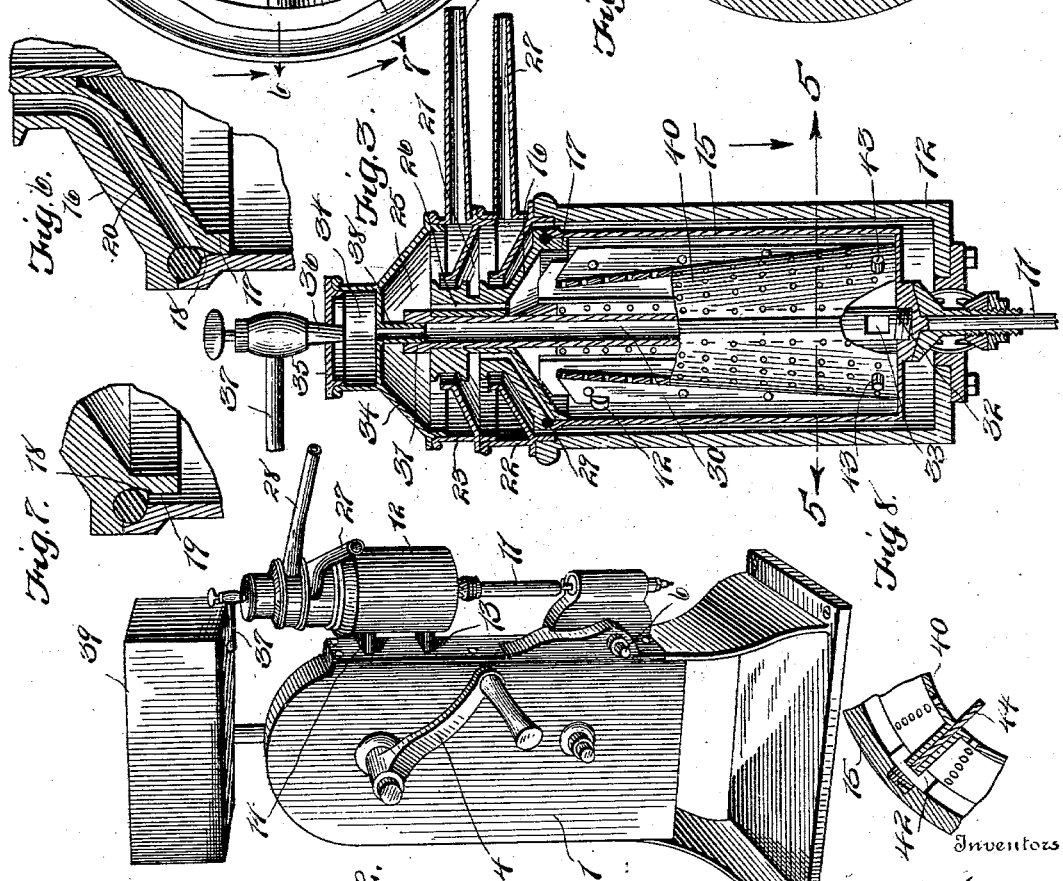
Witnesses
R. A. Boswell
T. G. Miller
Inventors
Emil Starch
and Benjamin Starch,
By W. J. FitzGerald & Co.
Attorneys No. 752,934.

Patented February 23, 1904.

UNITED STATES PATENT OFFICE.

EMIL STARCH AND BENJAMAN STARCH, OF LA CROSSE, WISCONSIN.

CREAM-SEPARATOR.

SPECIFICATION forming part of Letters Patent No. 752,934, dated February 23, 1904.

Application filed July 16, 1903. Serial No. 165,818. (No model.)

*To all whom it may concern:*

Be it known that we, EMIL STARCH and BENJAMAN STARCH, citizens of the United States, residing at La Crosse, in the county of La Crosse and State of Wisconsin, have invented certain new and useful Improvements in Cream-Separators; and we do hereby declare the following to be a full, clear, and exact description of the invention, such as will enable others skilled in the art to which it appertains to make and use the same.

Our invention relates to cream-separators, and more particularly to that variety of separator depending upon centrifugal motion; and it consists of certain novel features of combination and construction of parts, the preferred form or materialization whereof will be hereinafter fully set forth, and pointed out in the claim.

The prime object of our invention, among others, is the attainment of a great degree of simplicity whereby a number of features now common to centrifugal separators will be wholly eliminated or substituted by very simple means.

A further object of our invention is to provide mechanism which will more quickly accomplish the work of separation of the cream or oleaginous globules from the denser part and discharge the milk and cream through separate nozzles, whereby the separator will be left entirely empty of its contents when the separating process shall have been completed.

Other objects and advantages will be hereinafter made clearly apparent, reference being had to the accompanying drawings, which are made a part of this application, and in which—

Figure 1 shows a side elevation of our invention complete, the casing containing the actuating parts being shown in vertical section. Fig. 2 is a perspective detail view of our invention complete, ready for use. Fig. 3 is a longitudinal central section of our cream and milk separator proper. Fig. 4 is a plan view of the lower side of the cover or lid of the separator proper shown in Fig. 3. Fig. 5 is a horizontal section of Fig. 3 on line 5 5. Fig. 6 is a detail view of the discharge duct or channel through which the milk escapes. Fig. 7 is a detail view showing a cutaway portion of a part of the lid whereby a channel will be provided for the milk, said channel being adapted to communicate with the duct or channel shown in Fig. 6. Fig. 8 is a detail view showing the preferred means of holding the removable interior part of the body portion shown in Fig. 3, whereby it will be held against relative movement with respect to its casing or the body portion proper.

In order to conveniently refer to all of the various details of our invention and also to the coöperating accessories deemed necessary to show a practical application thereof to use, numerals will be employed, the same numeral applying to a similar part throughout the several views.

In carrying out our invention we provide a suitable casing 1 of the usual or any preferred construction, within which is mounted upon suitable bearings the driving-gears 2 and 3, the gear 2 being provided with an actuating-handle 4 or with a driving-pulley when the machine is to be driven by a motor. The gear 3, as will be observed by reference to Fig. 1, is placed in mesh with the gear 5, which is keyed rigidly to the shaft 6. The shaft 6 has also rigidly keyed thereto the gear 7, which is disposed in mesh with the worm 8, fixed to the shaft 9, which is provided at its upper end with a suitable union 10, whereby the shaft 9 may be readily connected to or disconnected from the shaft 11. The upper end of the shaft 11 is preferably solid and extends upward through a suitable opening in the bottom of the casing 12, which latter is stationary and connected in any desired way with the casing 1, as by means of the integral brackets 13 and 14, as clearly shown in Figs. 1 and 2.

Within the receptacle 12 we dispose the movable parts of our separator, consisting in this instance of the interior revoluble casing 15, which is rigidly connected in any preferred way to the upper end of the shaft 11 after it has passed through the bottom of the receptacle 12, as it is by means of said shaft that rotary motion is imparted to the casing 15.

We desire to call particular attention to the construction of the lid 16, designed to fit the receptacle or casing 15, as it is by means of such construction that the escape of the milk and cream is permitted to take place without in any wise interfering with the free flow and delivery of the milk and cream through separate discharging nozzles or spouts, as will be hereinafter particularly pointed out. By reference to Figs. 6 and 7 these details of construction of the lid 16 will be made clearly apparent, as it will be seen that said lid is provided with a depending flange 17, adapted to fit snugly within the mouth of the casing 15, and slightly above the edge of the flange 17 we form an annular groove 18, extending entirely around the flange near the upper edge thereof, and in order to provide communication between the interior of the casing or receptacle 15 and said annular groove we remove at certain intervals a portion of said flange, as indicated by the numeral 19 in Fig. 4, said cut-away portions being multiplied in number as may be thought most productive of the best results. At points intermediate said cut-away portions 16 we also provide three or more ducts 20, which extend upward to communicate with the annular chamber 21, formed by the auxiliary lid sections or caps 22 and 23, as is common, the cap 23 being surmounted by the closure-section 24. The auxiliary cap-sections 22, 23, and 24 are designed to provide annular chambers 21 and 25, said chambers being intended, respectively, for the milk and cream after the same shall have been separated from each other and forced upward therein by the centrifugal action of the interior parts, as will be hereinafter more particularly specified. By reference to Figs. 3 and 4 it will be seen that we have also provided a discharging-duct 26 for the escape of the cream, inasmuch as the milk will be thrown outward and will more readily enter through the cut-away portions 19 into the annular groove or recess 18 and thence find its way outward to the ducts 20, while the cream will pass directly upward through the port 26 and be delivered into the annular chamber 25. It will be observed that a discharging-spout or delivery-tube 27 is properly located upon the cap-section 22, so as to communicate with the annular chamber 21, while the delivery-tube 28 for the cream will be placed in communication with the annular chamber 25, it being understood that inasmuch as the several cap-sections 22, 23, and 24 are connected to or carried by the outer stationary casing 12 said parts will remain stationary while the interior parts are being revolved at a high rate of speed.

In order to prevent leakage around the main cap-section or closure 16 and the upper edge of the revoluble casing 15, we locate in a suitably-formed groove provided in the meeting edges of said parts a gasket 29, said gasket being so disposed that it will in no wise obstruct or interfere with the path of the milk, while at the same time a perfect seal will result.

In order to provide suitable means for introducing the milk to be separated into the receptacle or revoluble casing 15 and at the same time reliably lock the closure or lid-section proper, 16, in engagement with the casing 15, we entirely dispense with the usual threaded connection employed to hold said parts together and adopt the tubular locking-bolt 30, having a suitable head or shoulder 31 upon its upper end and a left-hand-threaded terminal 32 upon its lower end, said bolt, as above stated, being tubular and provided with a vent 33 at its lower end communicating with the bottom of the receptacle, 15. Furthermore, the closure or top section 24 is so formed as to have a superimposed chamber 34 and a suitable lid 35, which lid may be directly connected to in any preferred way or adapted to receive the nozzle 36, carried by the supply-pipe 37. The chamber 34 is also provided with a suitable opening in its central part, said opening communicating with the tubular extension or pipe 38, which latter fits at its lower end directly in the open end or door of the tubular bolt 30, and it therefore follows that inasmuch as the supply-pipe 37 is in proper communication with the receptacle 39 the milk placed in said receptacle will be delivered into the bottom of the revoluble chamber 15.

Designed to occupy the interior of the revoluble chamber 15 is the bifurcated and preferably conical member 40, which is open at both ends and provided with a plurality of outwardly-extending flanges 41, one or more of which may be properly received, and thereby secured against relative movement with the casing 15 in any preferred way, as by fitting a groove formed on a contiguous part of the casing 15, though preferably by means of the bolt 42, the head of which is grooved to receive said flange, this construction being considered cheaper and fully as desirable as the casting of guideways for said flange. While the member 40 is, as hereinbefore stated, preferably conical in longitudinal section, the flanges or guiding members 40 are, it will be understood, so formed that the outer edges thereof will be parallel with and fit closely against the inner face of the casing 15, thereby insuring a perfect centering within said casing of said conical member. If desired, suitable lugs or fingers 43 may also be provided for the base-section of the conical member 40, said lugs being of proper length to fit snugly against the face of the casing 15 at its lower end. The conical member 40 is also provided with a plurality of inwardly-directed blades 44, the office of which is to coöperate with the conical member in retarding a too free upward movement of the milk before the cream shall have been separated therefrom.

By providing a left-hand thread for the tubular securing-bolt 30 the normal rotation of the chamber 15 incident to the use thereof will tend to secure said bolt all the more tightly, thereby holding the closure or lid proper, 16, in a locked position, it being understood that a suitable seat is to be provided for the threaded end of said bolt in the bottom of said chamber 15.

It will thus be seen that we have provided a very simple though reliably efficient construction whereby the closure or lid-section proper, 16, is connected to the revolving chamber 15 without the employment of a threaded rim, as is common, and that by removing the tubular bolt 30 from its seat in the bottom of the chamber 15 the interior parts thereof are rendered easily accessible for the purpose of cleansing or the like.

While we have described the preferred combination and construction of parts deemed necessary in carrying out our invention, we wish to comprehend all substantial equivalents and substitutes that may be considered as falling fairly within the scope thereof.

Believing that the advantages and manner of using our improved centrifugal cream-separator have thus been made clearly apparent further description is deemed unnecessary.

What we claim as new, and desire to secure by Letters Patent, is—

The herein-described cream-separator comprising a suitable housing 1 and driving mechanism located therein; a stationary or outer casing 12; an inner revoluble casing located therein; a closure for said revoluble casing, said closure having a flange designed to be received by said revoluble casing, said flange having an annular groove and a plurality of ports communicating therewith; a suitable receiving-chamber for said ports and a discharge-pipe, said closure also having near its center a discharge-port for the cream; a suitable chamber and a discharge-pipe coöperating with said cream-port; a tubular locking-bolt having a threaded terminal and adapted to fit a seat in the bottom of the revoluble chamber whereby the closure or lid 16 will be locked in engagement therewith, said tubular bolt having an opening 33 in its lower end; suitable means to deliver the supply of milk through said tubular bolt whereby it will be delivered into the bottom of the revoluble chamber through said opening 33 and a bifurcated member 40 having interior and exterior flanges and suitable means to hold the revoluble chamber and said member against relative movement, all combined substantially as specified and for the purpose set forth.

In testimony whereof we affix our signatures in presence of two witnesses.

EMIL STARCH.
BENJAMAN STARCH.

Witnesses:
 GEO. W. BUNGE,
 CHRISTINE ONSUM.